Jan. 5, 1943.  W. G. WILSON  2,307,440
SEALING RING
Filed Nov. 7, 1940  2 Sheets-Sheet 1
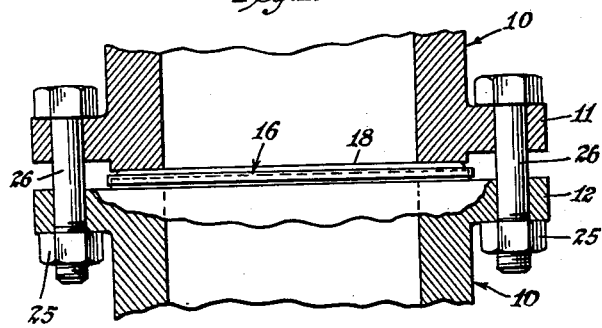
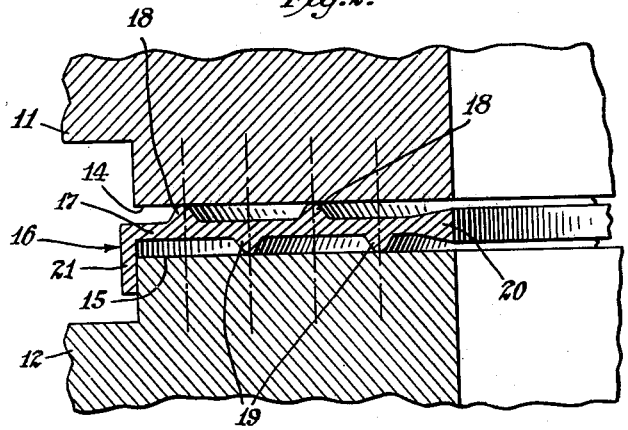
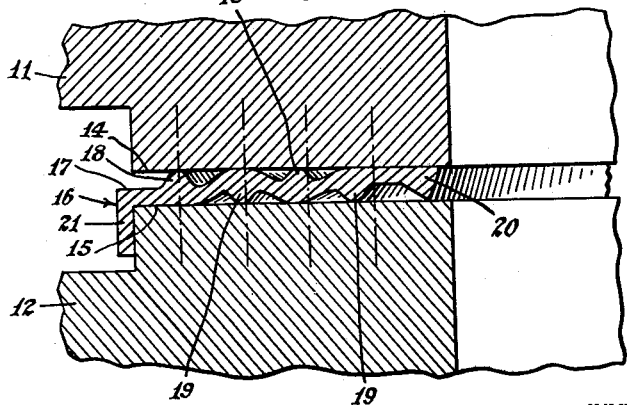
INVENTOR
Wylie G. Wilson
BY
Ramsey, Kent, Chisholm and Lutz
ATTORNEYS Jan. 5, 1943.  W. G. WILSON  2,307,440
SEALING RING
Filed Nov. 7, 1940  2 Sheets-Sheet 2
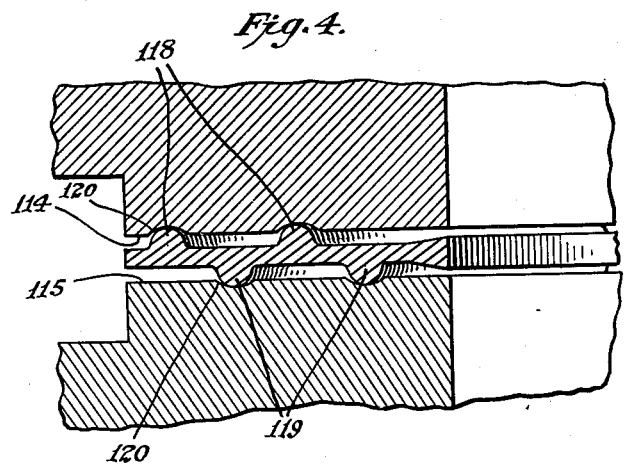
Fig. 4.
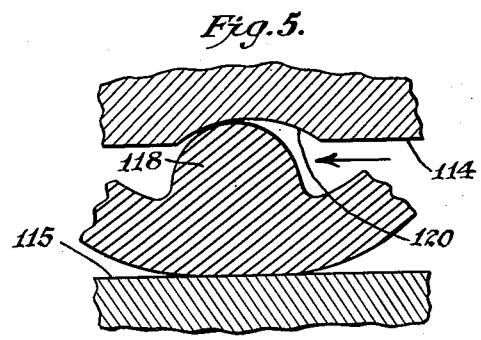
Fig. 5.
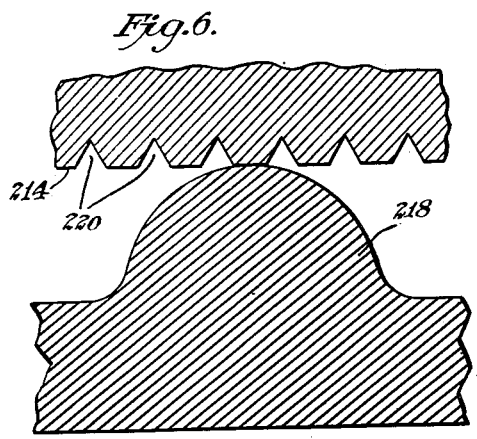
Fig. 6.
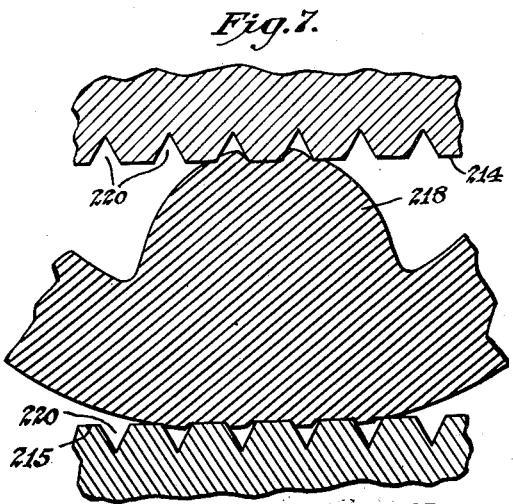
Fig. 7.
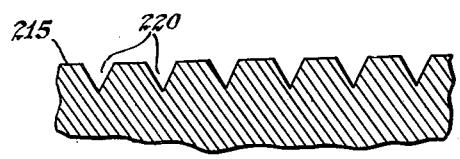
INVENTOR
Wylie G. Wilson
BY
Ramsey, Kent, Chisholm and Lutz
ATTORNEYS Patented Jan. 5, 1943

2,307,440

UNITED STATES PATENT OFFICE 2,307,440

SEALING RING

Wylie G. Wilson, Elizabeth, N. J.

Application November 7, 1940, Serial No. 364,620

8 Claims. (Cl. 288—23)

This invention relates to improvements in sealing rings and more particularly to improvements in rings of a type capable of being used for sealing purposes between the end formations of conventional pipe lengths.

An object of the present invention is to provide a sealing ring of such construction that it diminishes in cross-axial uniplanar subtended area under axial compression.

Another object of the invention is to provide a sealing ring of such construction that when axially compressed its cross-axial dimensions become reduced.

A further object of the invention is to provide a sealing ring of such construction that when axially compressed its inner and outer boundaries are moved toward each other.

Another object of the invention is to provide a sealing ring of such construction that when axially compressed, the distance between the inner and outer boundaries thereof is reduced.

A further object of the invention is to provide a sealing ring with integral annular ridges or projections, which projections are at least three in number and are located on the opposite sides of the ring in staggered relation.

A further object of the invention is to provide a sealing ring of the foregoing character which ring is made of suitable material so that when compressed axially, the ring is distorted about the projections as fulcrums to thereby cause the ring to assume more or less a corrugated form.

An additional object of the invention is to so construct a ring of the foregoing character that when the ring is axially compressed, the projections are moved across a compressing surface with a wiping or lapping motion to increase the efficiency of the seal so formed.

A further object of the invention is to provide a ring of the foregoing character which can be axially compressed either between compression members having smooth surfaces, grooved surfaces in initial alignment with the projections, or surfaces having a so-called "phonograph" finish.

Other features, objects and advantages of the invention will become apparent by reference to the following detailed description of the accompanying drawings wherein:

Fig. 1 is a vertical section partially in elevation of a fully drawn up joint formed by the union of two pipe ends with a sealing ring embodying the present invention interposed between surfaces of the pipe ends;

Fig. 2 is an enlarged fragmentary vertical section illustrating the disposition of a ring embodying the invention between pipe ends prior to these ends being drawn together;

Fig. 3 is a similar view illustrating the manner in which a ring of the present invention becomes distorted due to the application of axial compression to effect a good seal;

Fig. 4 is a view similar to Fig. 2 of the invention applied to pipe ends having annular grooves therein;

Fig. 5 is a still further enlarged fragmentary section showing the action of the sealing ring of Fig. 4 as the result of axial compression;

Fig. 6 is an enlarged fragmentary section illustrating the use of the invention in connection with surfaces having a so-called "phonograph" finish, and Fig. 7 is a similar view of the same parts following the application of axial compression.

Referring now to the drawings and particularly to Figs. 1 to 3 inclusive, 10 indicates generally the ends of two lengths of pipe, which ends are provided with flanges 11 and 12 respectively constructed in conventional character. Also the pipe ends are provided with customary raised faces 14 and 15 extending longitudinally beyond the edges of the flanges and having their peripheries spaced inwardly from the flange peripheries.

In conjunction with pipe ends of this character, use is made in the present invention, of a sealing ring indicated generally at 16, which ring has a body part 17, preferably of substantial thickness, with opposite flat surfaces over the major portion thereof. The continuity of these flat surfaces is interrupted at intervals by integral annular ribs or projections which are numbered 18 as to the upper projections and 19 as to the lower projections. The projections of any particular ring may be of any desired number with a minimum number of three. If such minimum number is used, then one projection will extend from one flat surface of the ring intermediate and preferably midway between the other two projections which will extend from the opposite surface of the ring. The projections on one surface are staggered relative to the projections on the other surface or, in other words, a projection on one surface will be located substantially equidistant cross-axially of the ring from the nearest projection or projections on the opposite surface. In the present illustration of the invention the ring 16 has been shown as being provided with four projections, two extending from each surface of the ring with the projections 18 staggered relative to the projections 19. The inner part of the ring 16 has its upper and lower edges diverging outwardly as shown at 20 for a purpose to be explained later. The outer edge of the ring 16 is provided with a right angular flange or lip part 21. The ring 16 is made of some suitable material which possesses the property of ductility (as distinguished from being brittle) or, in other words, the metal is of a character which is definitely resistant to distortion but which can be distorted without fracture. For many purposes soft or semisoft steel can be used admirably. By reference to the drawings, and particularly to Fig. 3, it will be seen that each formation is spaced from an adjacent formation on the opposite side of the body or flat portion a distance radially of the ring greater than the thickness of the body or flat portion. In other words, and for example, the radius of the innermost part of outer projection 18 exceeds the radius of the outermost part of outer projection 19 by an amount greater than the thickness of the body or flat portion 17. Likewise the radius of the innermost part of this same outer projection 19 exceeds the radius of the outermost part of inner protection 18 in the same manner.

The operation and use of a ring of the character just described is substantially as follows. Fig. 2 illustrates the position of a ring between pipe ends immediately prior to the application of compression to the ring by tightening nuts 25 on bolts 26 passing through the flanges 11 and 12. In this position the flange or lip 21 serves to center the ring relative to the pipe ends since this flange extends downwardly alongside the periphery of one of the raised surfaces 14 or 15. The inner end part 20 of the ring 16 is of a diameter closely corresponding to the internal diameter of the pipes. Under these conditions the upper ridges or projections 18 and the lower ridges or projections 19 have their extremities contacting respectively with the raised surfaces 14 and 15, the center lines of contact of the respective projections being indicated by the dot dash lines in Fig. 2. When the bolts 25 are tightened, pressure is applied to the extremities of both such upper and lower projections 18 and 19 by the raised surfaces 14 and 15, forcing the upper projections toward the lower face and the lower projections toward the upper face. This displacement of the projections causes a bending of the flat part 17 of the ring between the staggered projections until, when the flanges are completely drawn up by the bolts, the ring assumes the condition shown in Fig. 3.

In Fig. 3 the dot dash lines have been repeated and have been shown in the same positions relative to the pipe ends as in Fig. 2 so that the effects of the bending movement are clearly brought out. Due to the bending of the ring between the projections, the extremities of the projections contacting the surfaces 14 and 15 must move across these surfaces thereby diminishing the cross-axial distance between the projections and also shortening the cross-axial distance in one plane between the inner and outer boundaries of the ring. Since in the arrangement shown in Figs. 1 to 3, the flange or lip 21 prevents any substantial movement of any of the projections inwardly relative to the pipe ends, it follows that each of these projections must be moved outwardly toward the flange. Such outward movement, accomplished while pressure is being applied, causes the projections to wipe over the surfaces 14 and 15 or, in other words, causes these projections to be lapped into sealing contact with the flange faces as the joint is pulled up.

Furthermore, when the joint is finally tightened a series of annular ridges on each side of the ring are pressed into great pressure contact with the cooperating flange faces 14 and 15. In the final form therefore, the effect is similar to that which would be provided by a series of solid rings interposed between the flange faces, the sealing faces of such rings having been automatically lapped against the faces 14 and 15. The seal provided by such rings is more efficient than could otherwise be accomplished.

The flange or lip 21 which has an initially easy fit with one of the pipe ends serves as a centering device in the preferred form of the invention and also serves as before mentioned to cause all movement of the projections on the ring during compression to be radially outwardly. However, other centering arrangements can be used and if desired no centering provision need be made, in which event the ring may have a cross-axial width substantially equal to the cross-axial width of either of the parts 14 and 15. When a ring is made in this fashion, compression applied thereto, with resultant bending of the ring, causes the outer of the ridges to move inwardly while the inner of the ridges are moved outwardly. In this fashion change in the cross-axial uniplanar dimensions of the ring can be accomplished with the desirable lapping action or movement of all the projections against the opposing raised surfaces.

The sealing ring has its inner portion wedge-shaped as at 20 to provide at the extreme inner periphery of the ring an axial width or thickness sufficient to cause that part of the ring to contact with both flange faces when the joint is pulled up, but at the same time to give that part of the ring such a cross-sectional shape that it can be deformed without detrimentally affecting the pressure of the flange faces on the annular rings which form the actual sealing device between the flanges. In other words, the extreme inner periphery of the ring is made up of such a thickness that it will establish contact with both flange faces when the joint is pulled up but has an easily deformable section as to those portions of it which come in immediate contact with the flange faces. The wedge shape shown is the preferred shape of this portion of the ring but it will be evident that such portion could be made T-shaped or of any other configuration fulfilling the requirements for which it is designed. This special shape or shapes of the inner part of the ring (which can or cannot be used as desired) cause the establishment of such a seal as will prevent the formation of a pocket between the inner edge of the pipe flange and the first annular sealing projection in which pocket fluid might lie.

Since as before stated, the ring diminishes in uniplanar cross-axial dimension, it follows that the ring may have an initial internal diameter smaller than the internal diameter of the pipe. When the outer edge of the ring is held against inward movement as in Figs. 2 and 3, major change in dimensions will be accomplished by an increase in internal diameter of the ring (and if the outer edge of the ring is held against inward movement by a sufficiently rigid outer abutment, all change in dimensions may be accomplished by an increase in the internal diameter of the ring), so that when properly dimensioned, the ring when compressed, instead of extending into the pipe and offering an obstruction to the flow of material therethrough, can lie substantially flush with the inner wall of the pipe, or even be of greater diameter as shown in Fig. 3. This feature is in marked distinction to previous types of sealing rings which, when compressed, decrease in internal diameter to protrude into the pipe and create an obstruction to the flow of material.

Since the fundamental movement of the projections during the application of compression to the ring is a cross-axial movement, one projection toward another, modifications of the invention are possible. For example, as shown in Figs. 4 and 5, the sealing surfaces 114 and 115 may have shallow grooves 120 machined or otherwise provided therein, such grooves being spaced to be aligned with the respective projections 118 and 119. The grooves 120 as before mentioned are shallow and have sloping sides. If a ring is properly positioned with the extremities thereof centered relative to the various grooves, then the action of each projection during compression of the ring with consequent distortion thereof is of the fashion shown in Fig. 5. In this figure the innermost of the top projections 118 has been illustrated in conjunction with its groove 120. This innermost projection 118 will, when the ring is distorted or bent, move outwardly causing the extremity of the projection to ride along the inclined surface or wall of the groove 120 thereby adding a wedge-like lapping action to the normal lapping action. In this manner the sealing pressure effected by the projection is greatly increased. It will be understood of course that the action is the same for all of the projections regardless of whether an individual projection moves inwardly or outwardly relative to the pipe end.

The present invention is also adaptable for use in connection with flange faces having what is known in the art as "phonograph" finish. Such finish consists in the provision of a plurality of deep narrow grooves 220 in the opposing faces 214 and 215. The grooves 220 may be concentric grooves, or they may be spirally arranged on the respective surface. In Fig. 6, it will be seen that initially an extremity of a projection 218 contacts the surface of a flange end so constructed while the flat part opposite thereto is initially spaced from the lower surface 215. When the flange ends are drawn together in the customary fashion, the extremities of the various projections are moved in the manner before explained with the result that these extremities and the opposite surfaces are forced into various grooves 220 to bear with extremely high pressure (sealing pressure) against the axial faces of these grooves 220. This is due to the fact that the ring should be made of material less resistant to distortion than is the material of the flange faces.

From the foregoing it will be seen that the present invention provides an entirely new type of sealing ring which has characteristics heretofore not present in any device used for similar purposes. The ring has the advantage that it can be used in cooperation with standard pipe ends, i. e. pipe ends having standard flanges and raised surfaces thereon, since the ring can be made in stock sizes to fit the various stock sizes of pipe. Also since the action of the ring when compressed is the reverse of that heretofore accomplished by corrugated rings, the ring of this invention does not possess the disadvantage of offering an obstruction to the flow of material through a pipe line. The action of the ring in assuming a final corrugated shape is such that the sealing contact between parts of the ring and parts of the flange surfaces is the result of a lapping movement so that a more efficient seal is provided than would be the case of a simply direct axial pressure.

Rings can be made with any desired number of projections thereon, the minimum being three with two on one side of the ring and one on the other. For best results under normal circumstances, it is contemplated that five projections will be provided on a ring, three on one side and two on the other. The projections may be of various shapes within reasonable ranges, with the rounded extremity shown in the drawings being the preferred form, but whatever form be used it is desirable that the projection should be of symmetrical form on each side of its axial center line so that whether such annular projection move toward the center of the sealing ring or away from the center of the sealing ring, similar contours would be exhibited to the surface of the contacting flange face. The invention can be modified beyond the illustrated embodiments and therefore is to be limited only by the scope of the following claims.

What is claimed is:

1. As a new article of manufacture, a metallic sealing ring having a body portion provided with at least three integral formations having rounded extremities, said formations being disposed in staggered relation on the opposite sides thereof, each formation being spaced from an adjacent formation on the opposite side of the body portion a distance radially of the ring greater than the thickness of the body portion so that axial compression applied to the ring causes reduction in cross-axial uniplanar subtended area thereof.

2. A metallic sealing ring comprising a normally flat portion, said portion having a plurality of integral solid annular projections on the sides thereof, said projections having rounded extremities, the projections on one side being spaced apart cross-axially from the projections on the other side, and each formation being spaced from an adjacent formation on the opposite side of the flat portion a distance radially of the ring greater than the thickness of the flat portion whereby the extremities of such projections can contact with cooperating pressure applying faces, said projections causing the ring to become substantially corrugated upon the application of axial compression by said faces.

3. A metallic sealing ring comprising a normally flat portion, said portion having integral solid annular projections on each side thereof, said projections having rounded extremities, the projections on one side being spaced apart cross-axially in staggered relation from the projections on the other side, and each formation being spaced from an adjacent formation on the opposite side of the flat portion a distance radially of the ring greater than the thickness of the flat portion whereby the extremities of such projections can contact with cooperating pressure applying faces, said projections causing the ring to become substantially corrugated by cross-axial movement of the projections upon the application of axial compression by said faces.

4. A metallic sealing ring comprising a normally flat portion, said portion having integral solid annular projections on each side thereof, said projections having rounded extremities, the projections on one side being spaced apart cross-axially in staggered relation from the projections on the other side, and each formation being spaced from an adjacent formation on the opposite side of the flat portion a distance radially of the ring greater than the thickness of the flat portion whereby the extremities of such projections can contact with cooperating pressure applying faces, said projections causing the ring to become substantially corrugated, and the distance between projections to be decreased, and means integral with said ring for limiting movement of the projections to a cross-axial outward movement.

5. A metallic sealing ring comprising a normally flat portion, said portion having integral solid annular projections on each side thereof, said projections having rounded extremities, the projections on one side being spaced apart cross-axially in staggered relation from the projections on the other side, and each formation being spaced from an adjacent formation on the opposite side of the flat portion a distance radially of the ring greater than the thickness of the flat portion whereby the extremities of such projections can contact with cooperating pressure applying faces, said projections causing the ring to become substantially corrugated upon the application of axial compression by said faces, each projection and a portion of the ring in substantial axial alignment therewith forming an abutment contacting opposite parts of said faces.

6. A metallic sealing ring comprising a normally flat portion, said portion having integral solid annular projections on each side thereof, the projections on one side being spaced apart cross-axially from the projections on the other side whereby the extremities of such projections can contact with cooperating pressure applying faces, said faces having concentric depressions therein opposed to the extremities of the respective projections, said projections causing the ring to become substantially corrugated upon the application of axial compression by said faces, and causing cross-axial movement of the projections in pressure contact with the faces of the depressions.

7. A metallic sealing ring comprising a normally flat portion, said portion having integral solid annular projections on each side thereof, the projections on one side being spaced apart cross-axially from the projections on the other side whereby the extremities of such projections can contact with cooperating pressure applying faces, said faces having shallow relatively wide depressions therein with sloping walls, said depressions being axially aligned with the respective projections, said projections causing the ring to become substantially corrugated upon the application of axial compression by said faces, and causing cross-axial movement of the extremities of said projections in wedge-like lapping contact with the sloping walls of the depressions.

8. A metallic sealing ring comprising a normally flat portion, said portion having integral solid annular projections on each side thereof, the projections on one side being spaced apart cross-axially from the projections on the other side whereby the extremities of such projections can contact with cooperating pressure applying faces, said faces having spirally arranged depressions therein, said projections causing the ring to become substantially corrugated upon the application of axial compression by said faces, and causing cross-axial movement of the projections relative to the depressions so that the extremities of the projections are forced into the depressions and against the walls thereof.

WYLIE G. WILSON.